ns
3,796,702
α-CYANAMINOACETYL PENICILLINS
Hermann Breuer, Burgweinting, Germany, and Joseph Edward Dolfini, Princeton, Raymond C. Erickson, Metuchen, and William L. Parker, North Brunswick, N.J., assignors to E. R. Squibb & Sons, Inc., Princeton, N.J.
No Drawing. Filed Nov. 19, 1971, Ser. No. 200,522
Int. Cl. C07d 99/16
U.S. Cl. 260—239.1                   7 Claims

ABSTRACT OF THE DISCLOSURE

α-Cyanaminoacetyl penicillins of the general formula

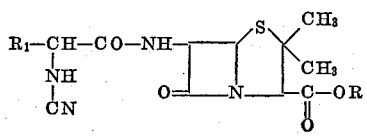

wherein R is hydrogen, lower alkyl, aralkyl, tri(lower alkyl)silyl, a salt forming ion or the group

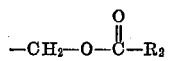

$R_1$ is hydrogen, lower alkyl, lower alkenyl, cycloalkyl, unsaturated cycloalkyl, adamantyl, aralkyl, aryl or certain heterocyclic groups; and $R_2$ is lower alkyl, aryl or aralkyl; are useful as antibacterial agents.

SUMMARY OF THE INVENTION

This invention relates to new α-cyanamino penicillins of the formula (I)

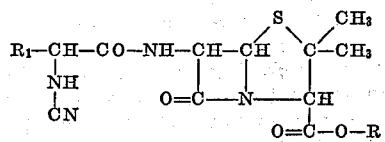

R represents hydrogen, lower alkyl, aralkyl, tri(lower alkyl)silyl, a salt forming ion or the group

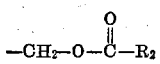

$R_1$ represents hydrogen, aryl, lower alkyl, lower alkenyl, saturated and unsaturated cycloalkyl, adamantyl, aralkyl or certain heterocyclic groups; $R_2$ represents lower alkyl, aryl or aralkyl.

The preferred members within each group are as follows: R is hydrogen, lower alkyl, alkali metal, trimethylsilyl or

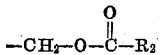

especially hydrogen, methyl, pivaloyloxy, sodium or potassium; $R_1$ is hydrogen, phenyl, thienyl, furyl, oxazolyl, isoxazolyl or thiazolyl, especially phenyl; $R_2$ is lower alkyl, preferably methyl or t-butyl.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like. The lower alkenyl groups are double bonded, monounsaturated radicals of the same type.

The cycloalkyl groups include saturated and unsaturated cyclic alkyl groups having three to seven carbon atoms and up to two double bonds, for example, cyclopropyl, cyclobutyl, cyclopentyl, cyclohexyl, cycloheptyl, cyclobutenyl, cyclopentenyl, cyclohexenyl, cyclohexandienyl and the like, and including in addition cycloheptatrienyl. The five and six carbon members are preferred and among the unsaturated members the 1,4-cyclohexadienyl group is preferred.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, cyano, carboxy, nitro, amino, di-lower alkylamino and the like. In the case of the last six named substituents there is preferably only one, especially in the para position of the phenyl. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl, p - hydroxyphenyl, p-carboxyphenyl and the like.

Both 1-adamantyl and 2-adamantyl groups are included, but the first is preferred.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The heterocyclic groups represented by $R_1$ are monocyclic heterocyclic radicals (having 5 or 6 atoms, exclusive of hydrogen, which are carbon, sulfur, nitrogen and oxygen, no more than two being other than carbon), including thienyl, furyl, pyridyl, oxazolyl, isoxazolyl and thiazolyl, as well as these heterocyclics with one or two of the substituents halo, lower alkyl (particularly methyl and ethyl), lower alkoxy (particularly methoxy and ethoxy) or phenyl.

The salt forming ions represented by R may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

The new cyanamino-acetylpenicillins of this invention are produced by reacting an α-aminopenicillin or a derivative thereof, e.g., a salt or ester, of the formula (II)

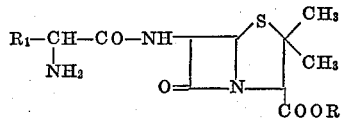

with a cyanogen halide or dicyanogen.

The reaction between a compound of Formula II or its derivative may be effected, for example, by dissolving or suspending the substance in an inert organic medium such as methylene chloride, dimethylformamide, methanol or the like, along with an acid binding agent such as triethylamine, pyridine or the like, then adding the dicyanogen or cyanogen halide. A low temperature, e.g., about 0° to —20° C., is preferred. The product of the reaction is then isolated by conventional procedures, e.g., by concentration or evaporation of the solvent. Salts are prepared by conventional procedures.

When R is the acyloxymethyl group

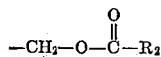

this group may be introduced onto the 6-aminopenicillanic acid moiety prior to the reaction with the dicyanogen or cyanogen halide by treatment with one or two moles of a halomethyl ester of the formula (III)  hal—CH$_2$OCOR$_2$ wherein hal is halogen, preferably chlorine or bromine, in an inert organic solvent such as dimethylformamide, acetone, dioxane, benzene or the like, at about ambient temperature or below.

As an alternative, a product of Formula I may be produced by reacting cyanamide or an alkali metal cyanamide such as sodium cyanamide with a compound of the formula (IV)

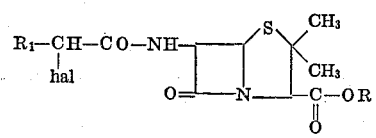

under the conditions described above. R and R$_1$ are the same as above, and hal is halogen, preferably bromine or chlorine.

According to another alternative, a product of Formula I may also be produced by reacting a compound of Formula II with an N-cyano-2-pyridone [2-oxo-1(2H)-pyridinecarbonitrile] which is substituted or unsubstituted on the pyridine ring. The reaction occurs under mild conditions, e.g., at about room temperature in an inert organic solvent such as dimethylsulfoxide, dimethylformamide, methylene chloride or the like.

The N-cyano-2-pyridones may be those described in U.S. application Ser. No. 148,037 filed May 28, 1971, by William Lawrence Parker and Saul Lewis Neidleman, having the formula (V)

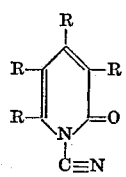

wherein each R may be the same or different and may be hydrogen, lower alkyl, lower alkenyl, hydroxy, lower alkoxy, cyano, halogen, carboxy, amido, mercapto, aliphatic or aromatic acyl radicals of up to 20 carbon atoms, phenyl, phenyl substituted by any of the foregoing groups, or aryloxy of up to 10 carbon atoms. These compounds may be prepared by reacting 2-acetoacetamidopyridine or a derivative thereof with an alkali metal nitrite at an acidic pH, e.g., about 2 to 4, or by reacting a salt of 2(1H)-pyridone, or a derivative thereof, with a cyanogen halide such as cyanogen bromide.

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to penicillin G and other penicillins. For example, a compound of Formula I or a physiologically acceptable salt thereof may be used in various animal species in an amount of about 1 to 200 mg./kg., daily, orally or parenterally, in single or two to four divided doses to treat infections of bacterial origin. For example, 5.0 mg./kg. may be used in mice.

Up to about 600 mg. of a compound of Formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1% by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

Example 1

3.49 g. of anhydrous D-α-aminobenzylpenicillin together with 3 ml. of triethylamine are dissolved in 40 ml. of anhydrous dimethylformamide. The solution is cooled to —20° and 1.05 g. of cyanogen bromide dissolved in 10 ml. of absolute methanol are added to the stirred solution over a period of 20 minutes. This is stirred for an additional hour at —20° and then 1 liter of ether is added. The viscous precipitate is washed once with fresh absolute ether.

This is then dissolved in about 20 ml. of methanol, treated with activated charcoal and filtered. The filtrate, containing D-6-[(α - cyanamino)phenylacetyl]aminopenicillanic acid, is treated with 6 ml. of a solution of 2 N potassium ethylhexanoate in n-butanol. Upon the addition of ether the potassium salt of D-6-[2-(cyanamino)-2-phenylacetamido]penicillanic acid precipitates, M.P. 205–207° (dec.). The yield amounts to 3.3 g. The sodium salt is formed similarly.

Example 2

0.42 g. (0.01 mol) of cyanamid are dissolved in 10 ml. of 1 N sodium methylate solution and the solution is evaporated to dryness under vacuum. The residue is taken up in 20 ml. of anhydrous dimethylformamide. The solution is cooled to —10° and to this are added, at this temperature, over a period of 20 minutes with stirring a solution of 4.13 g. (0.01 mol) of DL-6-[2-bromo-2-(phenylacetamido)]penicillanic acid in 10 ml. of anhydrous dimethylformamide. After stirring for 2 hours, 600 ml. of absolute ether are added. After standing for a while, the supernatant solvent is decanted from the precipitated product, DL-6-[2-(cyanamino) - 2 - phenylacetamido]penicillanic acid. The residue is dissolved in a little methanol, treated with 6 ml. of a 2 N solution of potassium ethylhexanoate in n-butanol, permitted to stand for one hour and filtered. The potassium salt of DL-6-[2-(cyanamino)-2-phenylacetamido]penicillanic acid is precipitated from the filtrate by the addition of ether.

The following additional products having the formula in the right-hand side of the table are obtained by the procedure of Example 1 by substituting for the D-α- aminobenzylpenicillin the compound having the formula in the left-hand part of the table:

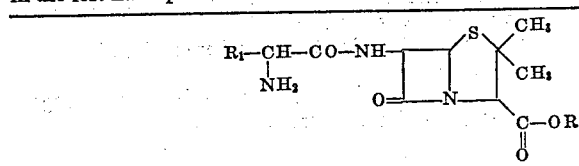

| Example | $R_1$ | R | R | $R_1$ |
|---|---|---|---|---|
| 3 | H | $CH_3$ | $CH_3$ | H |
| 4 | $CH_3$ | $C_2H_5$ | $C_2H_5$ | $CH_3$ |
| 5 | $C_3H_7$ | $CH_3$ | $CH_3$ | $C_3H_7$ |
| 6 | $C_6H_5CH_2$ | $-CH_2OC(O)-CH(CH_3)_2$ | $-CH_2OC(O)-CH(CH_3)_2$ | $C_6H_5CH_2$ |
| 7 | $4-ClC_6H_4$ | $-CH_2OC(O)-C_6H_5$ | $-CH_2OC(O)-C_6H_5$ | $4-ClC_6H_4$ |
| 8 | $3,4-(CH_3O)_2C_6H_3$ | $C_2H_5$ | $C_2H_5$ | $3,4-(CH_3O)_2C_6H_3$ |
| 9 | $3,4,5-(CH_3O)_3C_6H_2$ | $C_2H_5$ | $C_2H_5$ | $3,4,5-(CH_3O)_3C_6H_2$ |
| 10 | $4-CH_3C_6H_4$ | Na | Na | $4-CH_3C_6H_4$ |
| 11 | $3,4-(Br)_2C_6H_3CH_2$ | $C_2H_5$ | $C_2H_5$ | $3,4-(Br)_2C_6H_3CH_2$ |
| 12 | $2,4-(Cl)_2C_6H_3$ | $C_2H_5$ | $C_2H_5$ | $2,4-(Cl)_2C_6H_3$ |
| 13 | $C_6H_5$-isoxazole-$CH_3$ | $C_2H_5$ | $C_2H_5$ | $C_6H_5$-isoxazole-$CH_3$ |
| 14 | thienyl | $C_2H_5$ | $C_2H_5$ | thienyl |
| 15 | furyl | $C_6H_5CH_2$ | $C_6H_5CH_2$ | furyl |
| 16 | $C_2H_5$ | $-N(C_2H_5)_2$ | $-N(C_2H_5)_2$ | $C_2H_5$ |
| 17 | $C_6H_5$ | $-N(C_2H_5)_2$ | $-N(C_2H_5)_2$ | $C_6H_5$ |
| 18 | $C_6H_5$ | Na | Na | $C_6H_5$ |
| 19 | phenyl | H | H | phenyl |
| 20 | thienyl(S) | H | H | thienyl(S) |
| 21 | 1-adamantyl | H | H | 1-adamantyl |
| 22 | 2-adamantyl | H | H | 2-adamantyl |
| 23 | phenyl | K | K | phenyl |
| 24 | $CH_3CH=CH-$ | K | K | $CH_3CH=CH-$ |
| 25 | $CH_3CH=CH-CH_2-$ | H | H | $CH_3CH=CH-CH_2-$ |
| 26 | $CH_2=CH-CH=CH-$ | H | H | $CH_2=CH-CH=CH-$ |
| 27 | thienyl(S) | K | K | thienyl(S) |

Example 29

Sodium nitrite, 2 g., and 2-acetoacetamidopyridine, 1 g., are mixed with 200 ml. of water. The mixture is then adjusted to pH 3.0 with acetic acid and cooled on ice. After 2 hours at 0° C., the solution is extracted with ethyl acetate and the extract dried ($Na_2SO_4$) and concentrated in vacuo. The active material is isolated by chromatography on silica gel using chloroform-methanol (49:1). Sublimation at 90° C. and 0.02 mm. followed by recrystallization from benzene-cyclohexane (4:1) gives 20 mg. of 2-oxo-1(2H)-pyridinecarbonitrile, M.P. 100.5–101.5° C.

2-oxo-1(2H)pyridinecarbonitrile may also be prepared as follows:

A solution of 2(1H)-pyridone in one equivalent of 2 N aqueous sodium hydroxide is taken to dryness in vacuo and the residue is recrystallized from 95% ethanol, giving nacreous platelets of the hydrated sodium salt of 2(1H)-pyridone. A solution of the salt (10.8 g.) in 260 ml. of dimethylformamide (DMF) is added to a stirred solution of 1.0 g. of cyanogen bromide in 10 ml. of DMF at 0° over a period of 1.5 hours. After stirring for an additional 10 minutes at 0°, the DMF is removed in vacuo. The residue (dark brown) is dissolved as much as possible in chloroform, filtered, and the filtrate taken to dryness in vacuo. This residue is then dissolved in ethyl acetate and the solution is passed through a column of silica gel (300 g.) to remove the bulk of the colored impurities. Removal of the solvent gives 7.65 g. of solid that is then sublimed at 90–110° C. and 0.02 mm. Recrystallization of the sublimate (5.67 g.) from benzene-cyclohexane (4:1) gives 4.24 g. of pure 2-oxo-1(2H)-pyridinecarbonitrile, M.P. 100.5–101.5° C.

N - cyano - 2 - pyridone(2-oxo-1(2H)pyridinecarbonitrile) 36 mg. (20% excess), and 0.02 ml. of pyridine are added to a solution of 100 mg. of 2-aminobenzylpenicillin in 0.5 ml. of DMSO. After 3½ hours at room temperature, this solution is poured into 50 ml. of ethyl acetate. The ethyl acetate solution is washed twice with 10 ml. portions of 0.1 N HCl, and then with water and saturated NaCl solutions. After drying over $Na_2SO_4$ the ethyl acetate solution is evaporated to dryness in vacuo. The residue DL-6-[2 - (cyanamino)-2-phenylacetamido]penicillanic acid, after washing with benzene, weighs 57.6 mg.

What is claimed is:

1. A compound of the formula

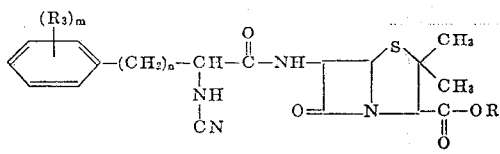

wherein R is hydrogen, lower alkyl, tri(lower alkyl)silyl,

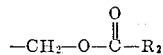

or a salt forming ion of the group consisting of aluminum, alkali metal, alkaline earth metal, dibenzylamine, N,N - dibenzylethylenediamine, methylamine, triethylamine, procaine and N-ethylpiperidine; $R_2$ is lower alkyl, aryl or aralkyl; $R_3$ is hydrogen, hydroxy, halogen, lower alkyl, lower alkoxy, lower alkanoyl or lower alkanoyloxy, said aryl and aralkyl being respectively, phenyl, phenyl-lower alkyl and said groups bearing on the phenyl, halo, lower alkyl, hydroxy, lower alkoxy, lower alkanoyl or lower alkanoyloxy; and $m$ is 1, 2 or 3 and $n$ is 0, 1, 2, 3 or 4.

2. A compound of the formula

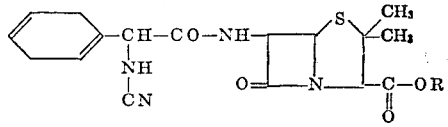

wherein R has the same meaning as in claim 1.

3. A compound as in claim 1 wherein R and $R_3$ each is hydrogen, $m$ is 1 and $n$ is 0.

4. A compound as in claim 1 wherein R is alkali metal, $R_3$ is hydrogen, $m$ is 1 and $n$ is 0.

5. A compound as in claim 2 wherein R is hydrogen or alkali metal.

6. A compound as in claim 1 wherein R is hydrogen, lower alkyl, alkali metal, trimethylsilyl or

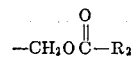

$R_2$ is lower alkyl, $R_3$ is hydrogen, $m$ is 1 and $n$ is 0.

7. A compound as in claim 2 wherein R has the same meaning as in claim 6.

References Cited
UNITED STATES PATENTS 3,673,183    6/1972    Erickson _____ 260—243 C NICHOLAS S. RIZZO, Primary Examiner U.S. Cl. X.R.

424—271